US009554552B2

(12) United States Patent
Mellberg et al.

(10) Patent No.: US 9,554,552 B2
(45) Date of Patent: Jan. 31, 2017

(54) METHOD AND DEVICE FOR SPRAYING DAIRY ANIMALS

(71) Applicant: DELAVAL HOLDING AB, Tumba (SE)

(72) Inventors: Sten Mellberg, Gustavsberg (SE); Henrik Olander, Stockholm (SE)

(73) Assignee: DeLaval Holding AB, Tumba (SE)

( * ) Notice: Subject to any disclaimer, the term of this patent is extended or adjusted under 35 U.S.C. 154(b) by 12 days.

(21) Appl. No.: 14/390,064

(22) PCT Filed: Mar. 15, 2013

(86) PCT No.: PCT/SE2013/050263

§ 371 (c)(1),
(2) Date: Oct. 2, 2014

(87) PCT Pub. No.: WO2013/162442

PCT Pub. Date: Oct. 31, 2013

(65) Prior Publication Data

US 2015/0053141 A1 Feb. 26, 2015

Related U.S. Application Data

(60) Provisional application No. 61/638,682, filed on Apr. 26, 2012.

(30) Foreign Application Priority Data

Apr. 26, 2012 (GB) .................................. 1207279.9

(51) Int. Cl.
*A01J 7/04* (2006.01)
*A61D 7/00* (2006.01)
*B05B 9/00* (2006.01)

(52) U.S. Cl.
CPC .. *A01J 7/04* (2013.01); *A61D 7/00* (2013.01); *B05B 9/002* (2013.01)

(58) Field of Classification Search
USPC ......... 119/670, 665, 14.18, 14.1; 901/41, 43
See application file for complete search history.

(56) References Cited

U.S. PATENT DOCUMENTS 2,532,077 A * 11/1950 Azbe ....................... F27B 1/005 432/79
2,532,088 A 11/1950 Cordis
(Continued)

FOREIGN PATENT DOCUMENTS

CA 2 730 797 A1 8/2011
CH EP 1520469 A1 * 4/2005 ............ A01J 5/0175
(Continued)

OTHER PUBLICATIONS

Supplementary International Search Report, dated Nov. 14, 2014, from corresponding PCR application.
(Continued)

*Primary Examiner* — Tien Dinh
*Assistant Examiner* — Morgan T. Barlow
(74) *Attorney, Agent, or Firm* — Young & Thompson

(57) ABSTRACT

A method and device for spraying dairy animals and in particular for spraying an udder region of dairy animals, including cows, during an at least partly or fully automatic milking process, includes providing a spray device mounted on a robot arm, the spray device including a spray nozzle with a spray opening, and a fluid channel feeding spray solution from an input port to the spray opening; pumping spray solution through the fluid channel towards the spray opening; heating the spray solution in a heating region of the
(Continued)

fluid channel; and spraying the heated spray solution through the spray opening towards the udder region of the dairy animal.

10 Claims, 2 Drawing Sheets

(56) References Cited

U.S. PATENT DOCUMENTS

| | | | | |
|---|---|---|---|---|
| 2,717,576 | A * | 9/1955 | Hansen | A01J 7/022 119/14.01 |
| 3,554,166 | A * | 1/1971 | Belden | A01J 7/04 119/14.01 |
| 3,793,987 | A * | 2/1974 | Rogers | A01K 13/001 119/161 |
| 4,505,229 | A * | 3/1985 | Altissimo | A01K 13/001 119/668 |
| 4,669,425 | A * | 6/1987 | Cook | A23N 17/00 119/670 |
| 4,936,255 | A * | 6/1990 | Pera | A01J 7/04 119/14.08 |
| 5,678,506 | A * | 10/1997 | van der Berg | A01J 5/0175 119/14.18 |
| 5,816,190 | A * | 10/1998 | van der Lely | A01J 5/0175 119/14.08 |
| 6,055,930 | A * | 5/2000 | Stein | A01J 7/04 119/14.08 |
| 6,089,242 | A * | 7/2000 | Buck | A01J 7/022 119/14.18 |
| 6,267,077 | B1 * | 7/2001 | van den Berg | A01J 7/025 119/14.01 |
| 6,443,094 | B1 * | 9/2002 | DeWaard | A01J 5/0175 119/14.18 |
| 6,553,942 | B1 * | 4/2003 | Eriksson | A01J 7/04 119/14.18 |
| 6,626,130 | B1 * | 9/2003 | Eriksson | A01J 7/025 119/651 |
| 6,860,226 | B2 * | 3/2005 | Nilsson | A01J 5/0175 119/14.02 |
| 7,299,766 | B2 * | 11/2007 | Van Den Berg | A01J 7/04 119/14.02 |
| 7,635,671 | B2 * | 12/2009 | Miyazaki | A61K 8/046 119/602 |
| 7,882,802 | B2 * | 2/2011 | Van Den Berg | A01J 7/04 119/14.02 |
| 8,646,412 | B2 * | 2/2014 | Eriksson | A01K 1/126 119/14.04 |
| 8,807,087 | B2 * | 8/2014 | Arnott | A01J 7/04 119/670 |
| 8,813,680 | B2 * | 8/2014 | Hofman | A01J 5/0175 119/14.03 |
| 8,899,185 | B2 * | 12/2014 | Hiley | A01J 7/04 119/14.18 |
| 2005/0076840 | A1 * | 4/2005 | Van Den Berg | A01J 5/017 119/14.04 |
| 2005/0223998 | A1 * | 10/2005 | Bosma | A01J 7/025 119/14.18 |
| 2008/0149035 | A1 * | 6/2008 | Van Den Berg | A01J 7/025 119/14.18 |
| 2010/0242845 | A1 * | 9/2010 | Pharaoh | A01J 7/04 119/14.04 |
| 2010/0310589 | A1 * | 12/2010 | Kumar | A61D 1/025 424/184.1 |
| 2011/0061602 | A1 * | 3/2011 | Moharram | A01K 13/001 119/651 |
| 2011/0110179 | A1 | 5/2011 | Richards et al. | |

FOREIGN PATENT DOCUMENTS

| | | | |
|---|---|---|---|
| CN | 201000171 | Y | 1/2008 |
| DE | 103 53 569 | A1 | 6/2005 |
| EP | 1 520 469 | A1 | 4/2005 |
| GB | 1175588 | A | 12/1969 |
| GB | 1 415 318 | A | 11/1975 |
| RU | 1831274 | A3 | 7/1993 |
| RU | 2233080 | C2 | 7/2004 |
| RU | 2244417 | C2 | 1/2005 |
| WO | 2010/068688 | A2 | 6/2010 |
| WO | 2011/010913 | A1 | 1/2011 |
| WO | 2012/053903 | A1 | 4/2012 |

OTHER PUBLICATIONS

British Search Report, dated Jul. 31, 2012, from corresponding British application.
International Search Report, dated Jul. 12, 2013, from corresponding PCT application.

* cited by examiner

METHOD AND DEVICE FOR SPRAYING DAIRY ANIMALS

The present invention relates to a method and device for spraying dairy animals and in particular for spraying the udder region of dairy animals, e.g. cows, for example during an at least partly or fully automatic milking process.

BACKGROUND

In recent years, automatic milking systems and other equipment have been developed in order to increase the efficiency of milk farms, e.g. by reducing the manual labour required and/or by increasing the average milk yield per cow.

A milking operation typically comprise a cleaning operation where teats are cleaned in a cleaning step, e.g. by rinsing and/spraying the teats with a cleaning fluid in order to remove any dirt or other material that may contaminate the milk. The cleaning step may reduce or eliminate undesired bacteria that may contaminate the milk. The spraying of cleaning fluid may be referred to as pre-spraying. The cleaning is followed by a milking step. After milking, the teats are typically sprayed with a spray solution, such as liquid, foam or other fluid, in order close the milk channels of the teats, e.g. for reducing the risk of mastitis. Spraying of teats after milking may be referred to as post-spraying.

WO 2010/068688 discloses a system and method for the delivery of sanitizing foam, where a teat dip solution is mixed with gas in a vessel. The temperature of the spray solution is kept substantially constant with a heat pump and a sensor positioned in the vessel in order to optimize the properties of the spray solution. The spray solution is circulated in a closed loop at a temperature of about 12° C. which may result in undesired bacteria growth in the spray solution.

There is a desire to reduce undesired stress on dairy animals during milking in order to improve the milk yield and the efficiency of automatic milking systems.

Despite the developments in automatic milking systems, there is still a need for methods and devices for improving different parts of a milking procedure in order to reduce costs, increase yield and/or improve cow health.

SUMMARY

Accordingly, a method for spraying the udder region of a dairy animal is provided, the method comprising providing a spray device on a robot arm, the spray device comprising a spray nozzle with a spray opening, the spray device comprising a fluid channel feeding spray solution from an input port to the spray opening; pumping spray solution through the fluid channel towards the spray opening; heating the spray solution in a heating region of the fluid channel; and spraying the heated spray solution through the spray opening towards the udder region of the dairy animal.

Further, a spray device for a spray robot, such as for spraying dairy animals, is provided, the spray device comprising a body element and a spray nozzle mounted on the body element and having a spray opening, the spray device comprising a fluid channel between an input port with a first connector and the spray opening, and at least one heating element adapted for heating spray solution in a heating region of the fluid channel.

The method and device of the present invention contributes to an improved spraying procedure by reducing sudden movements of the dairy animals during the spray procedure, which may lead to a more precise delivery of the spray solution to teats and the udder region in general, in particular when an automatic spray system is used. This in turn may lead to improved milk yield by improving the general health condition of the dairy animals.

Accordingly, the present method and device may reduce the occurrence of mastitis in a cow herd by improving the efficiency of an automatic spray system. Further, the risk of damaging the spray system or parts thereof is reduced.

Further, the present method and device reduce the risk of undesired bacteria growth in the spray solution, for example by enabling storage of spray solution in a spray solution reservoir at a low temperature to reduce undesired bacteria growth. This in turn may lead to improved milk yield by improving the general health condition of the dairy animals.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
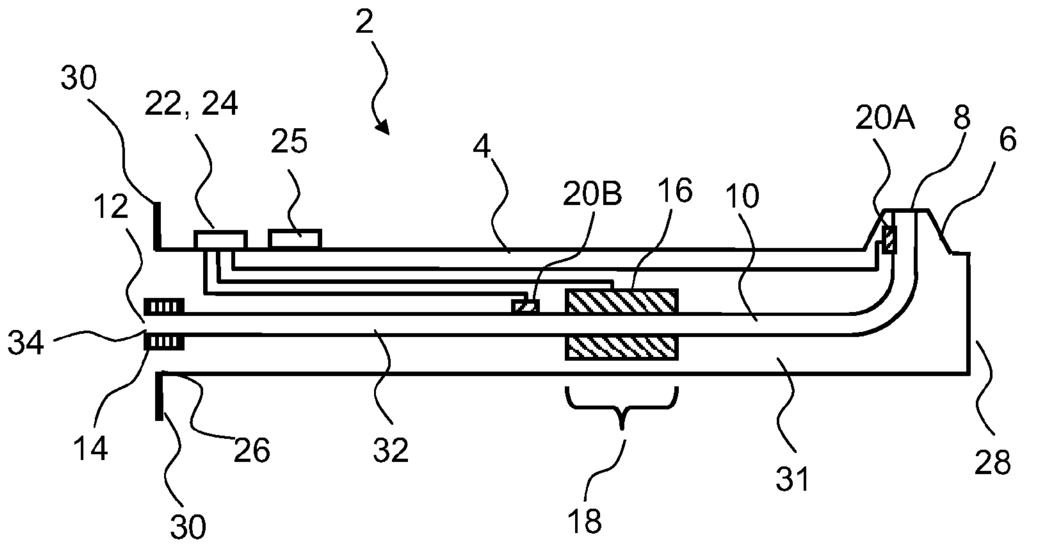
FIG. 1 schematically illustrates a spray device according to the invention.

The figures are schematic and simplified for clarity, and they merely show details which are essential to the understanding of the invention, while other details may have been left out. Throughout, the same reference numerals are used for identical or corresponding parts.

The method may be a method for post-spraying and/or pre-spraying the udder region of a dairy animal.

In the method, spray solution moves or is moved along a fluid or spray solution path from the input port of the spray device to the spray opening. The fluid path may comprise the fluid channel.

The method comprises providing a spray device on a robot arm, e.g. by mounting or attaching the spray device on the robot arm, e.g. at an end of the robot arm. The robot arm is part of a spray robot for dairy animals. The spray device may be mounted or secured to the robot arm via a connector unit arranged between the robot arm and the spray device. The connector unit may comprise a flexible joint, e.g. in the form of a coil spring or other mechanical assembly, adapted to absorb undesired stress or force on the spray device, e.g. from a kicking dairy animal. Thereby, undesired stress or force on the robot arm or the spray robot is reduced.

The method may comprise measuring at least one temperature of the spray solution in the fluid channel. Measuring of at least one temperature of the spray solution may comprise measuring a first temperature (T1) of the spray solution, e.g. with a first sensor element of the spray device. The first temperature may be measured downstream the heating region of the fluid channel, i.e. between the spray opening and the heating region. Measuring of the first temperature downstream the heating region and/or close to the spray opening enables feedback control (simple transfer function) of the output temperature of the spray solution exiting the spray opening.

Measuring of at least one temperature of the spray solution may comprise measuring a second temperature (T2) of the spray solution, e.g. with a second sensor element of the spray device. The second temperature may be measured upstream the heating region of the fluid channel, i.e. between the input port and the heating region.

The first and/or second sensor element(s) may be temperature sensor(s), e.g. adapted to provide data indicative of a temperature.

In the method, heating of spray solution in the heating region may be based on the at least one temperature of the spray solution. For example, heating of the spray solution may be based on the first temperature and/or the second temperature of the spray solution. By measuring temperature (s) and heating the spray solution based on the measured temperatures, the risk of heating the spray solution to an undesired temperature is minimized thereby reducing the risk of stressing the dairy animal when sprayed.

It is desired to be able to precisely control the temperature of the spray solution hitting the udder region or teats. Accordingly, the first temperature may be measured close to the spray opening. Thereby, the first temperature substantially corresponds to the output temperature of the spray solution, which may enable a more precise control of the spray solution temperature near or at the spray opening, which in turn may improve the temperature control of spray solution hitting the udder region or teats. The first temperature of the spray solution may be measured at a first position P1, e.g. at a first distance D1 of less than 50 cm from the spray opening along a spray solution path. The first distance may be less than 30 cm, such as less than 10 cm. The first temperature may be measured in the spray nozzle.

In the method, heating of spray solution may comprise heating the spray solution to a temperature in the range from 15° C. to 60° C., such as in the range from 20° C. to 45° C. In the method, heating of spray solution may be controlled such that the first temperature is in the range from 15° C. to 50° C. The spray solution may be heated in a heating region close to or at a short distance from the spray opening, such as at a distance of less than 50 cm, less than 30 cm, or less than 20 cm, from the spray opening along the spray solution path, e.g. to reduce undesired heat loss from the heating region to the spray opening. The spray solution is heated in the spray device. A reduced heat loss may lead to reduced energy consumption by enabling reduced heating of the spray solution. Accordingly, a heating element may be positioned at a distance of less than 50 cm from the spray opening along a spray solution path. The distance between a heating element, e.g. first heating element, and the spray opening taken along the fluid path may be less than 30 cm, such as less than 10 cm.

In particular during cold season, the temperature in the milking plant may affect the spray solution temperature from the spray opening to the udder region. In particular, when the temperature is low, e.g. less than 5° C., a considerable effect on the spray solution temperature may be experienced. In order to improve the temperature control of the spray solution, the method may comprise measuring an ambient temperature TA in the milking plant and base heating of spray solution in the heating region on the ambient temperature.

Further, the method may comprise insulating at least a part of the fluid channel. An insulated fluid channel and/or a heating region in the spray device, e.g. near the spray opening, may reduce the power consumption of the spray device by reducing the heat loss of the spray solution from the heating region to the spray opening. Further a more simple heating control may be sufficient.

Also disclosed is a spray device for a spray robot, e.g. a spray device for use in the method described herein. The spray device comprises a body element and a spray nozzle mounted on the body element. The body element has a first end and a second end and may comprise one or more engagement elements at the first end, e.g. for detachably mounting the spray device on the spray robot. The body element may be a elongated and/or tubular element. The body element may have a cavity. The cavity may constitute at least a part of the fluid channel. A first connector for connecting the fluid channel of the spray device to a spray solution reservoir may be provided on the body element. In one or more embodiments, the cavity of the body element may at least partly accommodate a tube constituting at least a part of the fluid channel and optionally having a first connector at a first end for connecting the fluid channel of the spray device to a spray solution reservoir, the tube constituting at least a part of the fluid channel.

The spray nozzle has a spray opening and a first cavity or channel leading spray solution to the spray opening. The first cavity is in fluid communication with the fluid channel. The spray nozzle may comprise a nozzle connector for connecting the spray nozzle to the fluid channel. The spray device may comprise a plurality of spray nozzles wherein each spray nozzle is connected to the fluid channel.

The spray device comprises a fluid channel between an input port with a first connector and the spray opening or a plurality of spray openings in one or more spray nozzles. The first connector is adapted for connecting, e.g. detachably connecting, the fluid channel to a spray solution reservoir. A tube at least partly accommodated in the cavity of the body element may constitute at least a part of the fluid channel.

The spray device comprises at least one heating element adapted for heating spray solution in a heating region of the fluid channel. The at least one heating element comprises a first heating element adapted for heating spray solution in a first heating region. The at least one heating element may comprise a second heating element adapted for heating spray solution in the first heating region or in a second heating region. A heating region may be defined as a section or part along the fluid channel where one or more heating elements transfer energy to spray solution in the fluid channel. The first and/or the second heating element may be an annular heating element surrounding the fluid channel.

The spray device may comprise a spray valve adapted to operate between a first position (closed) and a second position (open) for controlling the spraying of spray solution. The spray valve may be controlled by control signals from the spray robot.

The spray device may comprise at least one sensor element, e.g. for sensing or measuring one or more operating parameters of the spray device. The at least one sensor element may include a first sensor element for sensing a first temperature of the spray solution. The first sensor element is positioned at a first position P1. The first sensor element may be positioned downstream the first heating region. The first sensor element may be positioned at a first distance D1 less than 50 cm from the spray opening. The first distance may be less than 25 cm or advantageously less than 10 cm. The first sensor element may be arranged in the spray nozzle.

The at least one sensor element may include a second sensor element for sensing a second temperature of the spray solution in the fluid channel. The second sensor element is positioned at a second position P2. The second sensor element may be positioned upstream the first heating region. The second sensor element may be positioned at a second distance D2 from the spray opening.

The spray device may comprise a control unit connected to the at least one sensor element and the at least one heating element, wherein the control unit is configured for controlling the at least one heating element based on sensor signal(s) from the at least one sensor element. In one or more embodiments where the control unit is not part of the spray device, the at least one sensor element and the at least one heating element may be connected to one or more connectors for connecting the respective elements to a control unit.

The spray device may comprise a user interface connected to the control unit for setting or adjusting one or more operating parameters of the spray device, e.g. including desired output temperature of the spray solution at the spray opening. The user interface may comprise a display and/or one or more buttons. The user interface may comprise a touch-screen. In one or more embodiments where the control unit is not part of the spray device, the user interface may be connected to one or more connectors for connecting the user interface to a control unit.

The spray device may comprise a tube with the input port and the first connector at a first end for connecting the spray device to a spray solution reservoir, the tube having a second end connected to the spray nozzle. The tube may form at least a part of the flow path, and the input port may be at the first end. One or more sensor elements may be mounted on, inside or be embedded in the tube. One or more heating elements may be mounted on, inside or be embedded in the tube. The tube may be at least partly accommodated in the cavity of the body element.

The spray device may be a spray device for mounting on a robot arm or a connector unit, e.g. of a spray robot for spraying dairy animals. Accordingly, the spray device may be configured to be mounted on or secured to a spray arm or a connector unit of a spray robot. The body element may comprise one or more engagement elements, for example in the form of a flange with one or more openings, for detachably mounting the spray device on a spray robot. The one or more engagement elements may comprise recesses and/or protrusions in the body element, e.g. for forming a bayonet clutch with a robot arm or a connector unit. The one or more engagement elements may comprise an inner and/or outer thread on the body element.

The spray device may be used in a teat spraying method for reducing sudden movements of a dairy animal during spraying, in particular during automatic spraying.

The spray device and parts thereof disclosed herein may be used in a method as disclosed herein.

The method may be used in a spray robot, e.g. used in an automatic milking system.

FIG. 1 shows a spray device for a spray robot according to the present invention. The spray device 2 comprising a body element 4 and a spray nozzle 6 mounted on the body element 4 and having a spray opening 8, the spray device 2 comprising a fluid channel 10 between an input port 12 with a first connector 14 and the spray opening 8. The spray device 2 comprises a first heating element 16 adapted for heating spray solution in a first heating region 18 of the fluid channel 10. Further, the spray device 2 comprises a first sensor element 20A downstream the first heating region 18 and optionally a second sensor element 20B upstream the first heating region 18. The first sensor element and/or the second sensor element are adapted to sense respective first and second temperatures of the spray solution. The elements 16, 20A, 20B are connected to control unit 22 or control connector 24 via wires. The spray device may comprise a user interface 25 connected to the control unit 22 or the control connector 24. The body element 4 has a first end 26 and a second end 28 and comprises one or more engagement elements, for example in the form of a flange 30 with one or more openings for detachably mounting the spray device 2 on a spray robot. The one or more engagement elements may comprise recesses and/or protrusions in the body element, e.g. for forming a bayonet clutch. The one or more engagement elements may comprise an inner and/or outer thread on the body element. The body element 4 is a tubular element having a cavity 31 at least partly accommodating a tube 32 with the input port 12 and the first connector 14 at a first end 34 for connecting the spray device to a spray solution reservoir. The control unit 22 may be accommodated in the cavity 31. An insulation material may be accommodated in the cavity 31 between the body element 4 and the tube 32.

Figure 2:
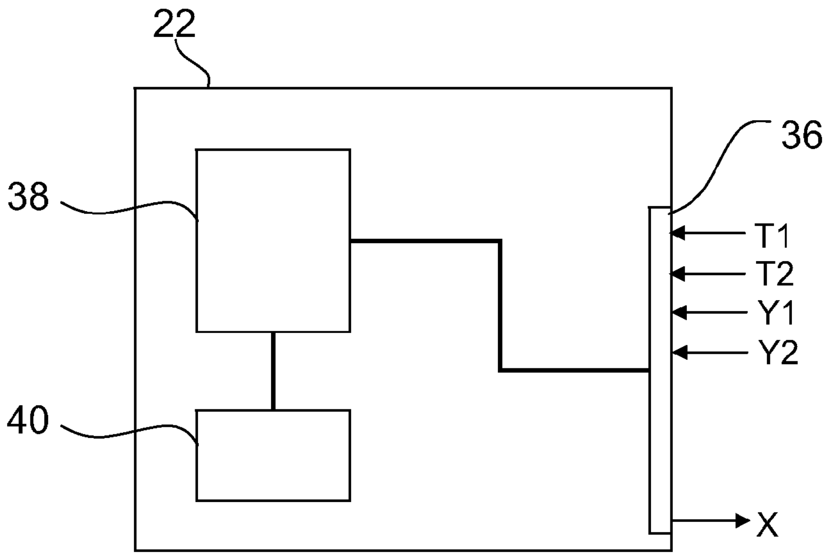
FIG. 2 schematically illustrates a control unit of a spray device.

FIG. 2 shows an exemplary control unit of a spray device. The control unit 22 comprises a controller interface 36 and a processor 38 connected to the controller interface 36. The control unit 22 is configured for receiving one or more signals T1, T2, . . . indicative of temperatures from sensor elements of a spray device via the controller interface 36. Optionally, the control unit 22 is configured for receiving one or more signals Y1, Y2, . . . indicative of user input to a user interface via the controller interface 36. Further, control unit 36 is adapted to send at least one control signal X to heating element(s) via the controller interface 36. The control unit 22 may comprise memory 40 connected to the processor 38. One or more control parameters, e.g. including transfer function parameters of the heating control and/or desired output temperature of the spray solution, may be stored in and/or retrieved from the memory 40 by the processor 38. The processor 38 receives temperature data and determines and sends control signal(s) to the heating element(s) based on a desired output temperature. A user may adjust the desired operating temperature via a user interface 25.

Figure 3:
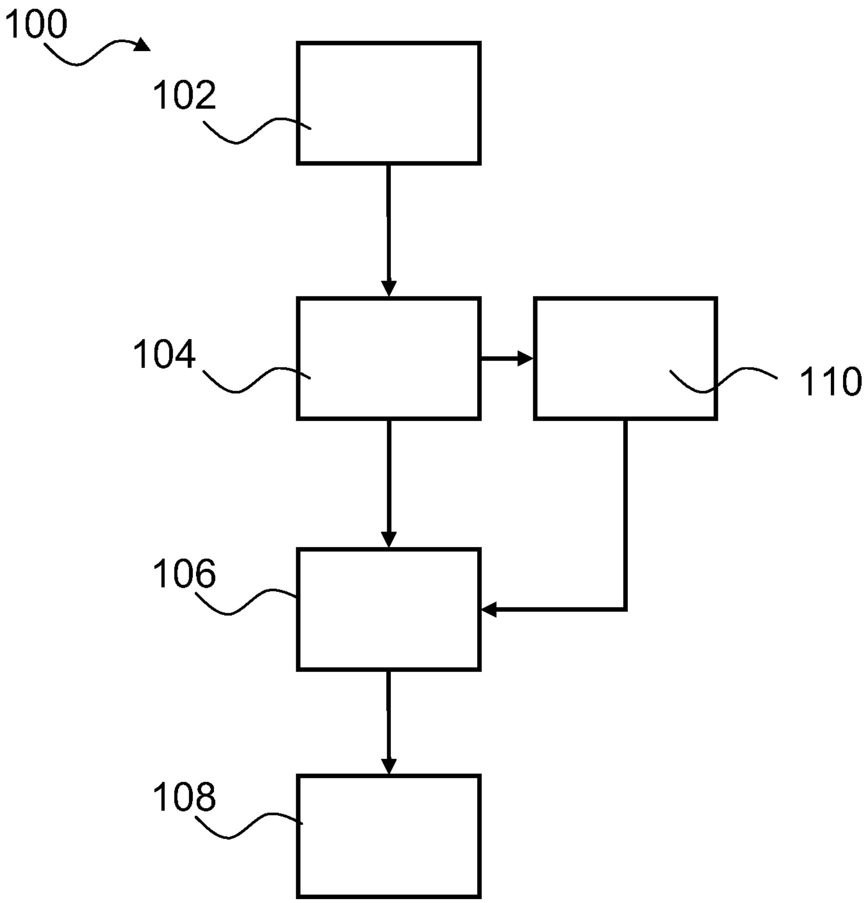
FIG. 3 is a flow chart of an exemplary method according to the invention.

FIG. 3 is a flow chart of a method for spraying the udder region of a dairy animal. The method 100 comprises providing 102 a spray device 2 on a robot arm, the spray device comprising a spray nozzle with a spray opening, the spray device comprising a fluid channel feeding spray solution from an input port to the spray opening. Further, the method comprises pumping 104 spray solution through the fluid channel towards the spray opening, and heating 106 the spray solution in a heating region of the fluid channel. Further, the method comprises spraying 108 the heated spray solution through the spray opening towards the udder region of the dairy animal. Even though the method is illustrated as performed in sequential steps, different steps may be performed at the same time. The method 100 optionally comprises measuring 110 at least one temperature of the spray solution in the fluid channel, and heating 106 spray solution in the heating region based on the at least one temperature of the spray solution. In the method 100, measuring of at least one temperature of the spray solution comprises measuring a first temperature T1 downstream the heating region and optionally measuring a second temperature T2 upstream the heating region. In the method 100, heating 106 of spray solution comprises heating the spray solution to a temperature in the range from 15° C. to 60° C., such as about 30° C. or about 40° C. Step 110 may comprise measuring an ambient temperature, e.g. within the milking plant, and heating 106 may be based on the ambient temperature.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCES

2 Spray device
4 Body element
6 Spray nozzle
8 Spray opening
10 Fluid channel
12 Input port
14 First connector
16 Heating element, first heating element
18 Heating region, first heating region
20A First sensor element
20B Second sensor element
22 Control unit
24 Control connector
25 User interface
26 First end of body element
28 Second end of body element
30 Flange
31 Cavity
32 Tube
34 First end of tube
36 Controller interface
38 Processor
40 Memory

The invention claimed is:

1. A spray device attachable to a spray robot, the spray device for spraying an udder region of a dairy animal, the spray device comprising:

a body element (4) having a first end (24) and an opposite, second end (28);

an engagement element (30) located at the first end (24) of the body element (4), the engagement element operable to detachably mount the body element (4) on a robot arm of the spray robot;

a spray nozzle (6) located at the second end of the body element (4), the spray nozzle (6) having a spray opening (8);

a fluid channel (10) extending between i) an input port (12) with a first connector (14) located at the first end of the body element, and ii) the spray nozzle (6) at the second end of the body element, wherein with the engagement element mounting the body element on the robot arm, the fluid channel is in fluid communication with spray solution provided from the spray robot and in operation the fluid channel sprays the spray solution received from the spray robot through the spray nozzle;

a heating element (16) located at a first region of the fluid channel, in operation the heating element heating the spray solution passing through the first region of the fluid channel;

a first temperature sensor (20A) that senses a temperature (T1) of the spray solution being sprayed from the spray nozzle, the temperature sensor (20A) being located downstream of the heating element (16) and upstream of the spray nozzle; and a control unit (22) connected to the first temperature sensor (20A), the control unit controlling the heating element to heat the spray solution to a desired operating temperature, wherein a tube (32) defines the fluid channel (10), the tube (32) comprising the input port (12) and being connected to the spray nozzle (6), the body element (4) is a tubular element having a cavity (31) that at least partly accommodates the tube (32) with the input port (12), and wherein the control unit (22) and the heating element (16) are each accommodated in the cavity (31).

2. The spray device of claim 1, further comprising:

a user interface (25) connected to the control unit (22), wherein the desired operating temperature is adjustable by a user via the user interface.

3. The spray device of claim 1, wherein, the engagement element is a flange (30) detachably mountable on the spray robot, and the heating element surrounds the first region of the fluid channel and is positioned at a distance of less than 50 cm from the spray opening along the fluid channel.

4. The spray device of claim 1, wherein, the engagement element is a bayonet clutch (30) detachably mountable on the spray robot, and the heating element surrounds the first region of the fluid channel and is positioned at a distance of less than 50 cm from the spray opening along the fluid channel.

5. The spray device of claim 1, wherein the heating element is positioned at a distance of less than 10 cm from the spray opening along the fluid channel.

6. The spray device of claim 1, further comprising insulation material in the cavity (31) between the body element (4) and the tube (32).

7. The spray device of claim 1, wherein the first temperature sensor (20A) senses an ambient temperature (T1), and the heating element surrounds the first region of the fluid channel and is positioned at a distance of less than 50 cm from the spray opening along the fluid channel, the control unit (22) and the heating element (16) are each accommodated in the cavity (31), and insulation material is provided in the cavity (31) between the body element (4) and the tube (32).

8. The spray device according to claim 1, wherein the spray device is removably attachable to a robot arm of a spray robot, wherein the engagement element mounts the body element on the robot arm of the spray robot, the fluid channel being in fluid communication with the spray solution provided from the spray robot, and in operation the fluid channel sprays the spray solution received from the spray robot through the spray nozzle, and the heating element heats the spray solution passing through the heating region of the fluid channel.

9. The spray device of claim 8, wherein the heating element surrounds the first region of the fluid channel and is positioned at a distance of less than 50 cm from the spray opening along the fluid channel.

10. A spray device attachable to a spray robot, the spray device for spraying an udder region of a dairy animal, the spray device comprising:

a body element (4) having a first end (24) and an opposite, second end (28);

an engagement element (30) located at the first end (24) of the body element (4), the engagement element operable to detachably mount the body element (4) on a robot arm of the spray robot;

a spray nozzle (6) located at the second end of the body element (4), the spray nozzle (6) having a spray opening (8);

a fluid channel (10) extending between i) an input port (12) with a first connector (14) located at the first end of the body element, and ii) the spray nozzle (6) at the second end of the body element, wherein with the engagement element mounting the body element on the robot arm, the fluid channel is in fluid communication with spray solution provided from the spray robot and in operation the fluid channel sprays the spray solution received from the spray robot through the spray nozzle;

a heating element (16) located at a first region of the fluid channel, in operation the heating element heating the spray solution passing through the first region of the fluid channel;

a first temperature sensor (20A) that senses a temperature (T1) of the spray solution being sprayed from the spray nozzle, the temperature sensor (20A) being located downstream of the heating element (16) and upstream of the spray nozzle; and a control unit (22) connected to the first temperature sensor (20A), the control unit controlling the heating element to heat the spray solution to a desired operating temperature, a second temperature sensor located downstream of the input port (12) and upstream of the first heating element (16) and that senses a temperature (T2) of the spray solution in the fluid channel prior to the heating element (16), the second temperature sensor being connected to the control unit (22), wherein the control unit (22) uses both the first and second temperatures to control the heating element to heat the spray solution to the desired operating temperature, wherein a tube (32) defines the fluid channel (10), the tube (32) comprising the input port (12) and being connected to the spray nozzle (6), and the body element (4) is a tubular element having a cavity (31) that at least partly accommodates the tube (32) with the input port (12).

* * * * *